United States Patent
Eom et al.

(10) Patent No.: US 8,387,117 B2
(45) Date of Patent: Feb. 26, 2013

(54) CONTEXT-AWARE ROLE-BASED ACCESS CONTROL SYSTEM AND CONTROL METHOD THEREOF

(75) Inventors: Young-Ik Eom, Seongnam-si (KR); Jung-Hwan Choi, Seoul (KR); Hyun-Su Jang, Suwon-si (KR); Youn-Woo Kim, Anyang-si (KR); Dong-Hyun Kang, Anyang-si (KR); Chang-Hwan Song, Jeollanam-do (KR)

(73) Assignee: Sungkyunkwan University Foundation for Corporate Collaboration, Suwon-si, Gyeonggi-do (KR)

( * ) Notice: Subject to any disclaimer, the term of this patent is extended or adjusted under 35 U.S.C. 154(b) by 989 days.

(21) Appl. No.: 12/371,670

(22) Filed: Feb. 16, 2009

(65) Prior Publication Data
US 2010/0100941 A1 Apr. 22, 2010

(30) Foreign Application Priority Data
Oct. 22, 2008 (KR) .................. 10-2008-0103839

(51) Int. Cl.
*G06F 7/04* (2006.01)
(52) U.S. Cl. .......... 726/4; 726/10; 726/18; 726/21; 726/26; 713/152; 713/168; 713/182; 707/781
(58) Field of Classification Search .............. None
See application file for complete search history.

(56) References Cited

U.S. PATENT DOCUMENTS
7,644,432 B2 * 1/2010 Patrick et al. ............... 726/1
2008/0016580 A1 * 1/2008 Dixit et al. .................. 726/27

OTHER PUBLICATIONS

Zhang et al. "A Rule-Based for Role-Based Delegation and Revocation" ACM, Aug. 2003, pp. 404-441.*
Yao et al. "Dynamic Role and Context-Based Access Control for Grid Applications", IEEE, Dec. 2005, pp. 1-3.*
Kulkarni et al. "Context-Aware Role-based Access Control in Pervasisve Computing System" pp. 1-10, Jun. 2008.*
Korean Office Action for Patent Application No. KR 10-2008-0103839 dated Feb. 17, 2010 (with English Translation).

* cited by examiner

*Primary Examiner* — Shewaye Gelagay

(57) ABSTRACT

A context-aware role-based access control system and a control method thereof. The context-aware role-based access control system includes: a context-aware user assignment manager (CAUAM) for performing a role assignment function, a role delegation function, or a role revocation function for a user according to a context of the user, based on a preset context request condition; a context-aware permission assignment manager (CAPAM) for performing a permission modification, a permission restoration, and a personalized permission modification for a permission, which the role has, according to changes in the context of the user; an information repository for storing a user profile and context information; and an access control manager (ACM) for controlling the context-aware user assignment manager, the context-aware permission assignment manager, and the information repository, and processing an access control request. Accordingly, more efficient access control can be achieved in ubiquitous environments where the context of the user dynamically changes.

16 Claims, 5 Drawing Sheets

RAT : $CRE_1 = \langle(Bob, (Time, (afternoon, Inter, 0100))), positive\rangle$

: $CRE_2 = \langle(Time, (Time, (afternoon, Inter, 0100))), positive\rangle$

: $CRE_3 = \langle(Sheduler, \langle Time, (afternoon, Inter, 0100) \wedge (Scheduler, (presentation, String, final))\rangle), positive\rangle$ : $CR_{RA} = \langle CRE_1, CRE_2, CRE_3 \rangle$ : $RAE = \langle R_{spreader}, CR_{RA} \rangle$ RDT : $CRE_1 = \langle(Sheduler, \langle(Time, (day, Integer, 20080815) \wedge (Businesstrip, (who, String, Bob))\rangle), positive\rangle$ : $CRE_2 = \langle(Time, \langle(Time, (day, Integer, 20080815) \vee (Time, (day, Integer, 20080816))\rangle), positive\rangle$ : $CRE_3 = \langle(Bob, \langle(Location, (office, String, samsung hq))\rangle), negative\rangle$ : $CR_{RD} = \langle CRE_1, CRE_2, CRE_3 \rangle$ : $RDE = \langle CR_{RD}, U_{Bob}, U_{John} \rangle$ PMT : $CRE_1 = \langle(Alice, (Location, (ward, String, 302))), positive\rangle$ : $CRE_2 = \langle(John, (Location, (ward, String, 302))), positive\rangle$ : $CRE_3 = \langle(Bob, \langle (Usage, (room, String, ward)) \wedge (Location, (ward, String, 302))\rangle), positive\rangle$ : $CR_{PM} = \langle CRE_1, CRE_2, CRE_3 \rangle$ : $PME = \langle R_{nurseRole}, P_{accessData}, CR_{PM}, read\rangle$

FIG. 3

CONTEXT-AWARE ROLE-BASED ACCESS CONTROL SYSTEM AND CONTROL METHOD THEREOF

CROSS REFERENCE TO RELATED APPLICATIONS

This application claims priority of Korean Patent Application No. KR 10-2008-0103839, filed Oct. 22, 2008.

BACKGROUND OF THE INVENTION

1. Field of the Invention

The present invention relates to a context-aware role-based access control system and a control method thereof, and more particularly to a context-aware role-based access control system capable of becoming aware of the context of the user, assigning/delegating/revoking a role according to the current context, and modifying/restoring an operation of the permission granted to the corresponding role, and a control method thereof.

2. Description of the Prior Art

With the arrival of the ubiquitous age, an environment is being created where various users use a service together and share various resources and information. In such a ubiquitous environment, an access control mechanism for permitting only a legally authorized subject to access resources and information is required. The access control policies include a discretionary access control (DAC) for optionally determining a subject's access to resources regardless of systems, a mandatory access control (MAC) for enabling a system to determine whether or not an access to resources is allowed, and a role-based access control (RBAC) for controlling the user's access to information based on a role performed by the user.

An RBAC model corresponds to an access control scheme of assigning access permissions for resources not to users, but to roles, and is to grant a role suitable for the current context and to modify the role through utilization of information on environments and the user's context, which are changed in real time. In order to more flexibly cope with the current context of the user, role-based access control schemes, such as a model for performing an access control according to environments through use of a state checking matrix, and a model for modifying a permission for a role according to information on environments through use of a state machine, have been proposed.

However, the conventional role-based access control models have limitations in that it is difficult to make a detailed description of context requests for dynamically providing a user assignment or permission assignment, that a role delegation which may occur in an access control is not taken into consideration because only a role or permission assignment is provided, and that an access control in which a personal preference is reflected is not supported.

SUMMARY OF THE INVENTION

Accordingly, the present invention has been made to solve the above-mentioned problems occurring in the prior art, and an object of the present invention is to provide a method for efficiently expressing context request conditions so as to cope with dynamic changes in ubiquitous environments, and to provide a personalized access control scheme in which the delegation of a user role and a personal preference are reflected.

In order to accomplish this object, in accordance with an aspect of the present invention, there is provided a context-aware role-based access control system including a context-aware user assignment manager (CAUAM) for performing a role assignment function, a role delegation function, or a role revocation function for a user according to a context of the user, based on a preset context request condition; a context-aware permission assignment manager (CAPAM) for performing a permission modification, a permission restoration, and a personalized permission modification for a permission, which the role has, according to changes in the context of the user; an information repository for storing a user profile and context information; and an access control manager (ACM) for controlling the context-aware user assignment manager, the context-aware permission assignment manager, and the information repository, and processing an access control request.

Preferably, the context-aware user assignment manager may include an adaptive assignment component (AAC) for assigning the user a role based on a first context request condition, which is preset to grant the user a role according to information on a location and a state of the user; an adaptive delegation component (ADC) for delegating the role of the user to a different user based on a second context request condition, which is preset for a context in which the role of the user is to be delegated to the different user; and an adaptive revocation component (ARC) for determining if the assigned or delegated role coincides with the preset context request condition, and revoking the assigned or delegated role when the assigned or delegated role does not coincide with the preset context request condition.

Preferably, the first context request condition may be established with the context request conditions, according to a role assignment table (RAT) which is defined in the form of role assignment elements (RAEs).

Preferably, the second context request condition may be established with the context request conditions, according to a role delegation table (RDT) in which the context request conditions are defined in the form of role delegation elements (RDEs).

Preferably, the adaptive revocation component may check if the role assignment table/the role delegation table coincides with the first/second context request condition, and revoke a user assignment element from a user assignment table (UAT) when the role assignment table/the role delegation table does not coincide with the first/second context request condition, thereby revoking the assigned or delegated role.

Preferably, the permission assignment manager may include an adaptive permission modification component (APMC) for modifying an operation of a permission, which a role granted by the context-aware user assignment manager has, based on a third context request condition preset according to contexts requiring modification; an adaptive permission restoration component (APRC) for checking if the modified permission coincides with the third context request condition, and restoring the operation of the modified permission to an original state when the modified permission does not coincide with the third context request condition; and a personalized permission modification component (PPMC) for modifying the permission, which the role assigned to the user has, into a permission highly preferred by the user among permissions for performing an equal operation, by making reference to a user profile.

Preferably, the third context request condition may be established with the context request conditions, according to a permission management table (PMT) which is defined in the form of permission management elements (PMEs) for contexts requiring modification.

Preferably, when the modified permission does not coincide with the third context request condition, the adaptive permission restoration component may read the pre-modification permission from a permission queue, and update the permission assignment table (PAT), thereby restoring the operation of the permission to an original state.

Preferably, the personalized permission modification component (PPMC) may update a permission assignment table with a permission highly preferred by the user, among permissions for performing an equal operation, by making reference to the user profile, thereby modifying the permission into a personalized permission.

Preferably, the information repository may include a user profile repository (UPR) for storing a state history of the user, and preference information of the user; and a context information repository (CIR) for storing the context information acquired from a ubiquitous environment.

Preferably, the access control manager may transmit the context information, which is updated, to the information repository.

In accordance with another aspect of the present invention, there is provided a control method of a context-aware user assignment manager (CAUAM) in a context-aware role-based access control system, the control method including the steps of assigning a role to a user based on a first context request condition, which is preset to grant the user a role according to information on a location and a state of the user; checking if a second context request condition, which is preset for a context in which the role of the user is to be delegated to a different user, is satisfied; creating a user assignment element (UAE) which includes delegator information and a delegator's role when the second context request condition is satisfied as a result of the check; updating a user assignment table (UAT) with the created user assignment element, and delegating the role to the different user; determining if the assigned or delegated role coincides with the preset context request condition; and revoking the assigned or delegated role when the assigned or delegated role does not coincide with the preset context request condition as a result of the determination.

Preferably, the first context request condition may be established with the context request conditions, according to a role assignment table (RAT) which is defined in the form of role assignment elements (RAEs), and the second context request condition may be established with the context request conditions, according to a role delegation table (RDT) in which the context request conditions are defined in the form of role delegation elements (RDEs).

In accordance with yet another aspect of the present invention, there is provided a control method of a context-aware permission assignment manager (CAPAM) in a context-aware role-based access control system, the control method including the steps of assigning or delegating, by a context-aware user assignment manager, a role suitable for a context of a user; checking if an operation of a permission, which the assigned or delegated role has, corresponds to a third context request condition which is preset according to contexts requiring modification; modifying the operation of the permission according to the third context request condition, when the operation of the permission corresponds to the third context request condition as a result of the check; determining if the modified permission coincides with the third context request condition; reading the pre-modification permission from a permission queue (PQ), when the modified permission does not coincide with the third context request condition as a result of the determination; and updating a permission assignment table with the pre-modification permission, and restoring the operation of the permission to an original state.

Preferably, the third context request condition may be established with the context request conditions, according to a permission management table (PMT) which is defined in the form of permission management elements (PMEs) for contexts requiring modification.

According to the present invention, as described above, it is possible to assign/delegate/revoke a role adaptively to the current context of the user, it is possible to modify/restore a permission granted to a role according to a context request condition, and it is possible to perform modification to a personalized permission by taking the preference information of the user into consideration.

Accordingly, more efficient access control can be achieved in ubiquitous environments where the environments of the user dynamically change.

BRIEF DESCRIPTION OF THE DRAWINGS

The above and other objects, features and advantages of the present invention will be more apparent from the following detailed description taken in conjunction with the accompanying drawings, in which:

FIG. 3 is a view illustrating each table used in the context-aware role-based access control system according to an exemplary embodiment of the present invention;

DETAILED DESCRIPTION OF THE PREFERRED EMBODIMENTS

Figure 1:
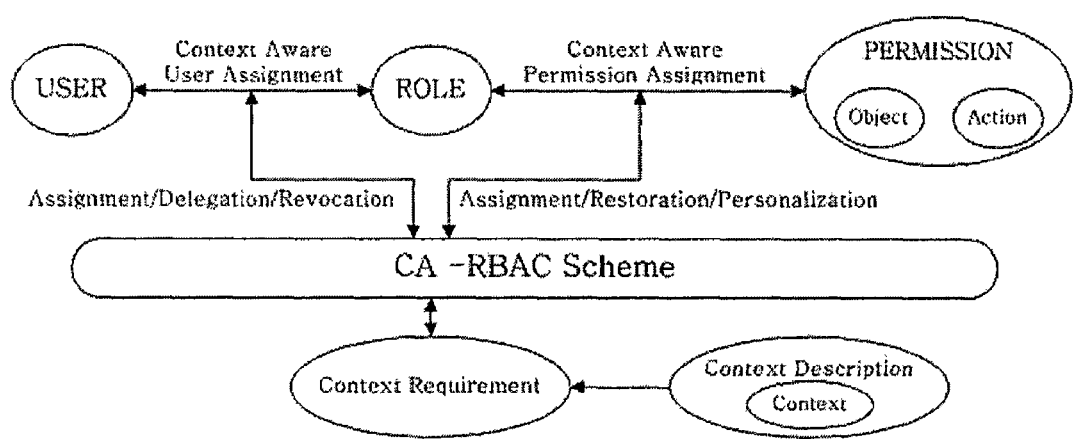
FIG. 1 is a view illustrating the concept of a context-aware role-based access control model which is employed in the present invention.

Before a detailed description of the present invention, a Context-Aware Role-Based Access Control (CA-RBAC) model used in the present invention will be briefly described with reference to FIG. 1.

Differently from the conventional CA-RBAC model in which user assignment (UA) and permission assignment (PA) are performed by a security manager, the CA-RBAC model according to the present invention is implemented such that the user assignment and the permission assignment are provided based on preset context request conditions (or context requests). That is, based on various context information collected in a ubiquitous environment, an access control is performed to be suitable for the current context requests. As shown in FIG. 1, through the CA-RBAC model, the user can dynamically assign or delegate a role suitable for the current context request condition to a different user, or can revoke an assigned/delegated role, without the intervention of a security manager. Here, since a method for describing context request conditions is required, the definitions of the principal components of the CA-RBAC model will first be described.

Definition 1 (User): When a set of users is denoted as "U," one user "$u_i$" belongs to "U," i.e. there is a relation $u_i \in U$. Various roles $r_1, r_2, \ldots, r_m$ can be assigned to a plurality of users $u_1, u_2, \ldots, u_n$.

Definition 2 (Role): When a set of roles is denoted as "R," one role "$r_i$" belongs to "R," i.e. there is a relation $r_i \in R$. Various roles $r_1, r_2, \ldots, r_m$ can be assigned various permissions $p_1, p_2, \ldots, p_n$.

Definition 3 (Permission): When a set of permissions is denoted as "P," and one permission "$p_i$" belongs to "P," i.e. there is a relation $p_i \in P$.

One permission is constructed as "$p_i = <o, a>$," wherein "o" represents an object, and "a" represents an operation. A user is a subject whose access is controlled. The user is granted a role to which a permission is assigned, and exercises the permission. Users and roles have a many-to-many relationship, where each user can have a plurality of roles, and each role can be assigned to a plurality of users. A role is a set of permissions relating to the attributes thereof. Roles and permissions have a many-to-many relationship, where each role can have a plurality of permissions, and each permission also can be included in a plurality of roles. A permission corresponds to an approval to actually exercise access control, and is constituted by a targeted object and an operation to be performed.

A relation between users and roles, and a relation between roles and permissions include assignments linking them, which are called user assignment and role assignment, respectively, and are defined as follows.

Definition 4 (User Assignment): When a user assignment table is denoted as a UAT, one user assignment element $UAE_i$ belongs to UAT, i.e. there is a relation $UAE_i \in UAT$. One user assignment element is constructed as "$UAE_i = <U_j, R_K, \text{delegationStatus}>$."

Definition 5 (Permission Assignment): When a permission assignment table is denoted as PAT, one permission assignment element $PAE_i$ belongs to PAT, i.e. there is a relation $PAE_i \in PAT$. One permission assignment element is constructed as "$PAE_i = <R_j, P_K>$."

The user assignment (UA) shows a mapping relation between users and roles currently assigned to the users. A user assignment element (UAE) includes information on a user, a role, and whether or not delegation takes place, and a UAT which is a table showing the mapping relation is filled with detailed elements. The permission assignment (PA) shows a mapping relation between permissions assigned to roles. A permission assignment element (PAE) includes information on a role and a permission, and a PAT which is a table showing the mapping relation is filled with detailed elements. That is, the UAT and the PAT include information on user assignment and permission assignment, which are required for the current role-based access control.

According to the CA-RBAC model proposed by the present invention, the user assignment and the permission assignment are dynamically performed according to the current context by means of context information. In order to perform dynamic assignment using context awareness, it is necessary to define context, context description, and context request conditions.

Definition 6. (Context): When the set of all contexts is denoted as "C," one context "$C_i$" belongs to "C," i.e. there is a relation $C_i \in C$. One context is constructed as "$C_i = <\text{contextName, contextAttr}>$", wherein contextAttr=<attrName, attrtype, attrvalue>. That is, one context $C_i$ is constructed as "$C_i = <\text{contextName, (attrName, attrType, attrValue)}>$."

The context includes state information, such as the location of the user, the context of the user, and available resources, which can be converted into data. A context is constituted by a context name and a context attribute, wherein the context attribute includes an attribute name, an attribute type, and an attribute value. The context name may be expressed by a name representing a context, such as a time or a location, and the context attribute includes a detailed value for the context. For example, the location context for a Distributed Computing Laboratory may be expressed as "<Location, (laboratory, String, Distributed Computing)>," and the time context for 9 a.m. may be expressed as "<Time, (morning Inter, 0900)>."

Ex. 1) $Location_1$=Location, (laboratory, String, Distributed Computing)>

Ex. 2) $Time_1$=<Time, (morning Inter, 0900)>

Definition 7 (Context Description): When the set of all context descriptions is denoted as "CD," one context description "$CD_i$" belongs to "CD," i.e. there is a relation $CD_i \in CD$. One context description is constructed as "$CD_i = <\text{subjectID}, (C_1, C_2, \ldots, C_n)>$."

The context description connects a plurality of contexts with an object, thereby enabling the current context to be expressed in more detail. The context description includes the corresponding subject of the current context, wherein a plurality of contexts are mixed together. The corresponding subject may be a person, or may be a thing. For example, that Bob is in $location_1$ at $time_1$ may be expressed as "$CD_1 = <\text{Bob}, (C_{location1}\ C_{time1})>$." When a subject corresponds to a thing, that $schedule_1$ and $schedule_2$ have been input in a scheduler may be expressed as "$CD_2 = <\text{Scheduler}, (C_{schedule1}\ C_{schedule2})>$".

Definition 8 (Context Request Condition): When the set of all context request conditions is denoted as "CR," one context request condition "$CR_i$" belongs to "CR," i.e. there is a relation $CR_i \in CR$. One context request condition is constructed as "$CR_i = (CRE_1, CRE_2, \ldots CRE_n)$" wherein $CRE_i = <CD_i, \text{PositiveOrNegative}>$, and True or False is returned.

The context request conditions correspond to request conditions required for dynamically performing user assignment and permission assignment, and user assignment and permission assignment is achieved when a corresponding context request condition is satisfied. That is, through the setting of context request conditions for user assignment and permission assignment, it becomes possible for the user to perform dynamic access control according to changes in the current state or context of the user. The context request is constituted by context request elements (CREs), and includes information on a context information description and information on whether the context information description is "True" or "False" It is determined from the current context information if a CRE is satisfied, True is returned when the CRE coincides with the current context, and False is returned when the CER does not coincide with the current context. If the plurality of CREs are all True, the CR returns True, and if not, the CR returns False.

Hereinafter, the present invention will be described in detail with reference to the accompanying drawings.

Figure 2:
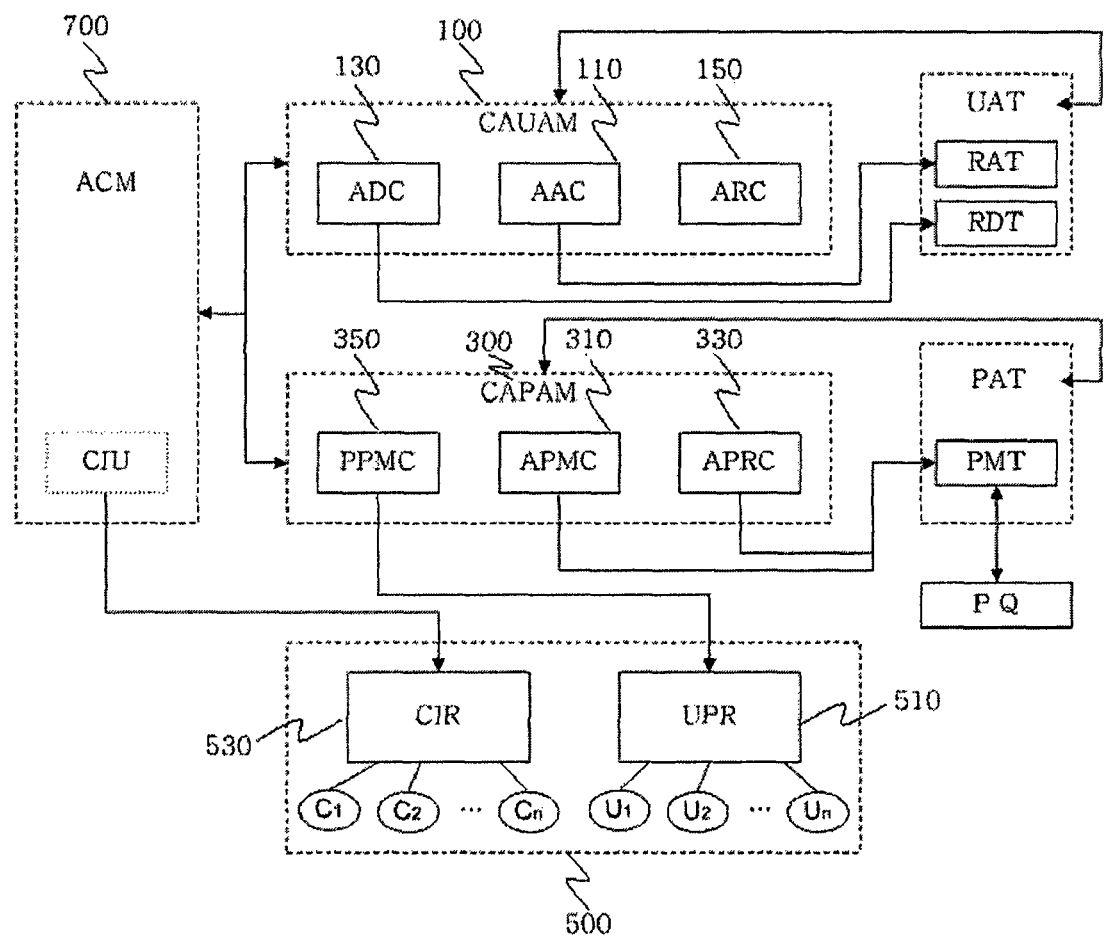
FIG. 2 is a block diagram illustrating the configuration of a context-aware role-based access control system according to an exemplary embodiment of the present invention.

FIG. 2 is a block diagram illustrating the configuration of a context-aware role-based access control system according to an exemplary embodiment of the present invention.

Referring to FIG. 2, the context-aware role-based access control system according to an exemplary embodiment of the present invention includes a context-aware user assignment manager 100, a context-aware permission assignment manager 300, an information repository 500, and an access control manager 700.

The context-aware user assignment manager (CAUAM) 100 performs role assignment, role delegation, and role revocation functions for the user according to the context of the user based on preset context request conditions, and includes an adaptive assignment component 110, an adaptive delegation component 130, and an adaptive revocation component 150.

The adaptive assignment component (AAC) 110 can assign the user a role based on the first context request condition, which has been preset to grant the user a role according to information on the location and state of the user. Here, the first context request condition is established with context request conditions, according to a role assignment table (RAT) which has been defined in the form of role assignment elements (RAEs) ($RAE_i \in RAT$, $RAE_i = <R_j, CR_{RA}>$).

Role $R_j$ and $CR_{RA}$, which is a context request condition for granting the role, are defined in an RAE. When the context request condition is satisfied, role $R_j$ is updated in the user assignment table (UAT), which includes an RAT and an RDT, so that the role can be assigned to the user. Occasionally, it is determined if a CRE is True based on the current context information. When all CREs are satisfied and $CR_{RA}$ is True, a new user assignment element (UAE) can be created in the UAT, and a role can be assigned to the user. Pseudo code of an adaptive role assignment algorithm is shown below.

Algorithm 1. Adaptive Role Assignment

```
INPUT User U, RAE(1,...,n) in RAT, Current context C
OUTPUT UAEz
BEGIN
    WHILE RAE.CR ! = true
        Set result to 0
        Read current context C
        FOR i=0 to n DO
            IF RAE.CR.CREi = true THEN result ← result + 1
            END IF
        END FOR
        IF result == n THEN RAE.CR ← true
        ELSE THEN RAE.CR ← false
        END IF
    END WHILE
    Create UAEz with <U, RAE.R, none>
    Insert UAEz to UAT
END
```

The adaptive delegation component (ADC) 130 can delegate a role of a specific user to a different user based on the second context request condition, which has been preset for a context in which the role of the specific user is to be delegated to a different user. Here, the second context request condition is established with context request conditions according to a role delegation table (RDT), in which the context request conditions have been defined in the form of role delegation elements (RDEs) ($RDE_i \in RDT$, $RDE_i = <CR_{RDj}, U_{delegator}, U_{delegatee}>$).

A context request condition for delegating a role, a user (i.e. delegator) who is to delegate the role, and a user (i.e. delegatee) whom the role is to be delegated to are specified in an RDE. When the corresponding context request condition is satisfied, a UAE, including information on a delegator and the roles of the delegator, is created, and the UAT is updated, so that the role can be delegated to a user. Occasionally, it is determined if a CRE is True based on the current context information. When all CREs are satisfied with respect to a user, and $CR_{RD}$ is True, a new UAE for the delegator's roles is created from the UAT, and the delegator's roles are all granted to a delegatee, so that a delegation can be achieved. Pseudo code of an adaptive role delegation algorithm is shown below.

Algorithm 2. Adaptive Role Delegation

```
INPUT User U, RDE(1,...,n) in RDT, Current context C
OUTPUT UAEz
BEGIN
    WHILE RDE.CR ! = true
        Set result to 0
        Read current context C
        FOR i=0 to n DO
            IF RDE.CR.CREi = true THEN result ← result + 1
            END IF
        END FOR
        IF result == n THEN RDE.CR ← true
        ELSE THEN RDE.CR ← false
        END IF
    END WHILE
    FOR z=0 to n DO
        Create UAEz with <Udelegatee, Udelegator.Rz, Udelegator>
        Insert UAEz to UAT
    END FOR
END
```

Meanwhile, the adaptive revocation component (ARC) 150 determines if an assigned or delegated role coincides with a preset context request condition, and can revoke the assigned or delegated role when the role does not coincide with the preset context request condition.

The adaptive role revocation component determines if roles assigned or delegated to a user satisfy a context request condition up to now, and can again revoke a role when the role does not satisfy the context request condition. The RAT and the RDT are checked with the current context every time, and a UAE is removed from the UAT when a CR is satisfied, so that an assigned or delegated role can be immediately revoked. Pseudo code of an adaptive role revocation algorithm is shown below.

Algorithm 3. Adaptive Role Revocation

```
INPUT User U, assigned RAE(1,...,n) in RAT, assigned RDE(1,...,m)
in RDT, Current context C
OUTPUT UAEz
BEGIN
    WHILE RAE.CR == true || RDE.CR == true
        Set result to 0
        Set result2 to 0
        Read current context C
        FOR i=0 to n DO
            IF RAE.CR.CREi = true THEN result ←
            result + 1
            END IF
        END FOR
        FOR i=0 to m DO
            IF RDE.CR.CDEi = true THEN result2 ←
            result2 + 1
            END IF
        END FOR
        IF result == n THEN RAE.CR ← true
        ELSE IF result2 == m THEN RDE.CR ← true
        ELSE THEN RAE.CR ← false. RDE.CR ← false
        END IF
    END WHILE
    IF RAEi.CR == false THEN Delete UAEz from UAT wher
UAEz is <U, RAEi.R, none>
    ELSE IF RDEi.CR == false THEN
        FOR z=0 to n DO
            Delete UAEz from UAT where
                UAEz.Udelegator == RDEi.Udelegator
        END IF
END
```

The context-aware permission assignment manager 300 performs permission modification, permission restoration, and personalized permission modification functions for a permission, which a role has, according to changes in the context of the user. The context-aware permission assignment manager 300 includes an adaptive permission modification component 310, an adaptive permission restoration component 330, and a personalized permission modification component 350.

The adaptive permission modification component (APMC) 310 can modify an operation of a permission, which a role granted by the CAUAM 100 has, based on the third context request condition preset according to contexts requiring modification. Here, the third context request condition is established with context request conditions, according to a permission management table (PMT) which has been defined in the form of permission management elements (PMEs) for contexts requiring modification (PME$_i \in$ PMT, PME$_i$=<R$_j$, P$_k$, CR$_{PM}$, condition$_A$>).

Here, a PME is constituted by role "R$_j$," permission "P$_k$," context request "CR$_{PM}$" for the modification of the permission, and a condition to be modified. When the CR$_{PM}$ of a PME is satisfied, the corresponding permission of the role is modified. According to whether the condition to be modified corresponds to inactivation, or corresponds to read/write/execution, the modification is processed in different schemes. When the condition to be modified corresponds to inactivation, an existing permission to be inactivated is stored in a permission queue (PQ) for the sake of restoration, and is then removed from the PAT. Meanwhile, in the case of permission modification into read/write/execution, permissions to be modified are first stored in the PQ, and then the operation part of an existing permission can be updated to the new permission in the PAT. Pseudo code of an adaptive permission modification algorithm is shown below.

---

Algorithm 4. Adaptive Permission Modification

---

INPUT RME$_{(1,...,n)}$ in RMT, PAE$_{(1,...,m)}$ in PAT, Current context C, PermissionQueue
OUTPUT PAE$_z$
BEGIN
    WHILE PME.CR ! = true
        Set result to 0
        Read current context C
        FOR i=0 to n DO
            IF PME.CR.CRE$_i$ = true THEN result ← result + 1
            END IF
        END FOR
        IF result == n THEN PME.CR ← true
        ELSE THEN RDE.CR ← false
        END IF
    END WHILE
    IF PME.Condition == disable THEN
        Copy PAE$_z$ to PermissionQueue where PAE$_z$ = <PME.R, PME.P>
        Delete PAE$_z$ from PAT
    ELSE THEN
        Copy PAE$_z$ to PermissionQueue where PAE$_z$ = <PME.R, PME.P>
        Modify PAE$_z$.P.A to PME Condition
        Update PAE$_z$ to PAT
    END IF
END

---

The adaptive permission restoration component (APRC) 330 checks if a permission modified by the APMC 310 coincides with the third context request condition, and can restore the modified permission's operation to the original state when the modified permission does not coincide with the third context request condition. Explaining the restoration in more detail, when a modified permission does not coincide with the third context request condition, the APRC 330 reads a pre-modification permission from the PQ, and updates the permission assignment table (PAT) (wherein a PMT corresponds to the entire or a part of a PAT), thereby restoring the operation of the permission to the original state. Explaining the update in more detail, when a permission has been modified into an inactivation state, the update may be performed in such a manner as to read a pre-modification permission from the PQ, to insert the read permission into the PAT, thereby activating the permission. In addition, when a permission has been modified and changed to another permission, the update may be performed in such a manner as to read a conventional permission from the PQ, and to change the PAT. Pseudo code of an adaptive permission restoration algorithm is shown below.

---

Algorithm 5. Adaptive Permission Restoration

---

INPUT assigned RME$_{(1,...,n)}$ in RMT, PAE$_{(1,...,m)}$ in PAT,
Current context C, PermissionQueue
    OUTPUT PAE$_z$
    BEGIN
        WHILE PME.CR == true
            Set result to 0
            Read current context C
            FOR i=0 to n DO
                IF PME.CR.CRE$_i$ = true THEN result ← result + 1
                END IF
            END FOR
            IF result == n THEN PME.CR ← true
            ELSE THEN RDE.CR ← false
            END IF
        END WHILE
        IF PME.Condition == disable THEN
            Get PAE$_z$ from PermissionQueue where PAE$_z$.P == PME.P
            Insert PAE$_z$ to PAT
        ELSE THEN
            Get PAE$_z$ from PAT where PAE$_z$.P == PME.P
            Modify PAE$_z$.P.A to PME Condition
            Update PAE$_z$ to PAT
        END IF
    END

---

The personalized permission modification component (PPMC) 350 can modify a permission, which a role assigned to a user has, into a permission highly preferred by the user among the permissions for performing the same operation, by making reference to a user profile 510 to be described below. The PPMC 350 modifies a permission into another permission for which the user has a high preference by making reference to the user profile 510, and updates the PAT, thereby modifying the corresponding permission into a personalized permission. A personalized permission modification algorithm is shown below.

---

Algorithm 6. Personalized Permission Modification

---

INPUT User U, UPR, PAE$_{(1,...,n)}$ in PAT
    OUTPUT PAE$_z$
    BEGIN
        IF    PAE$_z$.P.A    ==    UPR.U.A    THEN
            Modify    PAE$_z$.P.O    to
UPR.U.A.preferenceObject
        END IF
    END

---

Meanwhile, the information repository 500 stores a user profile and context information, and may include the user profile repository (UPR) 510 for storing the context history and preference information of the user, and a context information repository (CIR) 530 for storing context information acquired from a ubiquitous environment.

The access control manager (ACM) 700 can process access control requests to the context-aware role-based access control system by controlling the CAUAM 100, the CAPAM 300, and the information repository 500. Especially, the ACM 700 transmits context information, which is updated according to changes in the context, to the information repository 500, i.e. to the CIR 530, so that the current context information can be stored in the CIR 530 of the information repository 500.

FIG. 3 is a view illustrating each table used in the context-aware role-based access control system according to an exemplary embodiment of the present invention. As shown in FIG. 3, the tables used in the context-aware role-based access control system according to an exemplary embodiment of the present invention include a role assignment table (RAT), a role delegation table (RDT), and a permission management table (PMT).

Referring to each table shown in FIG. 3, it can be understood that a context request condition (an example of the aforementioned first context request condition) for Bob to perform an announcer role has been set in the RAT, that a context request condition (an example of the aforementioned second context request condition) to delegate the role to John when Bob goes on a business trip has been set in the RDT, and that a context request condition (an example of the aforementioned third context request condition) to control the permission of a role of Alice according to contexts has been set in the PMT.

Figure 4:
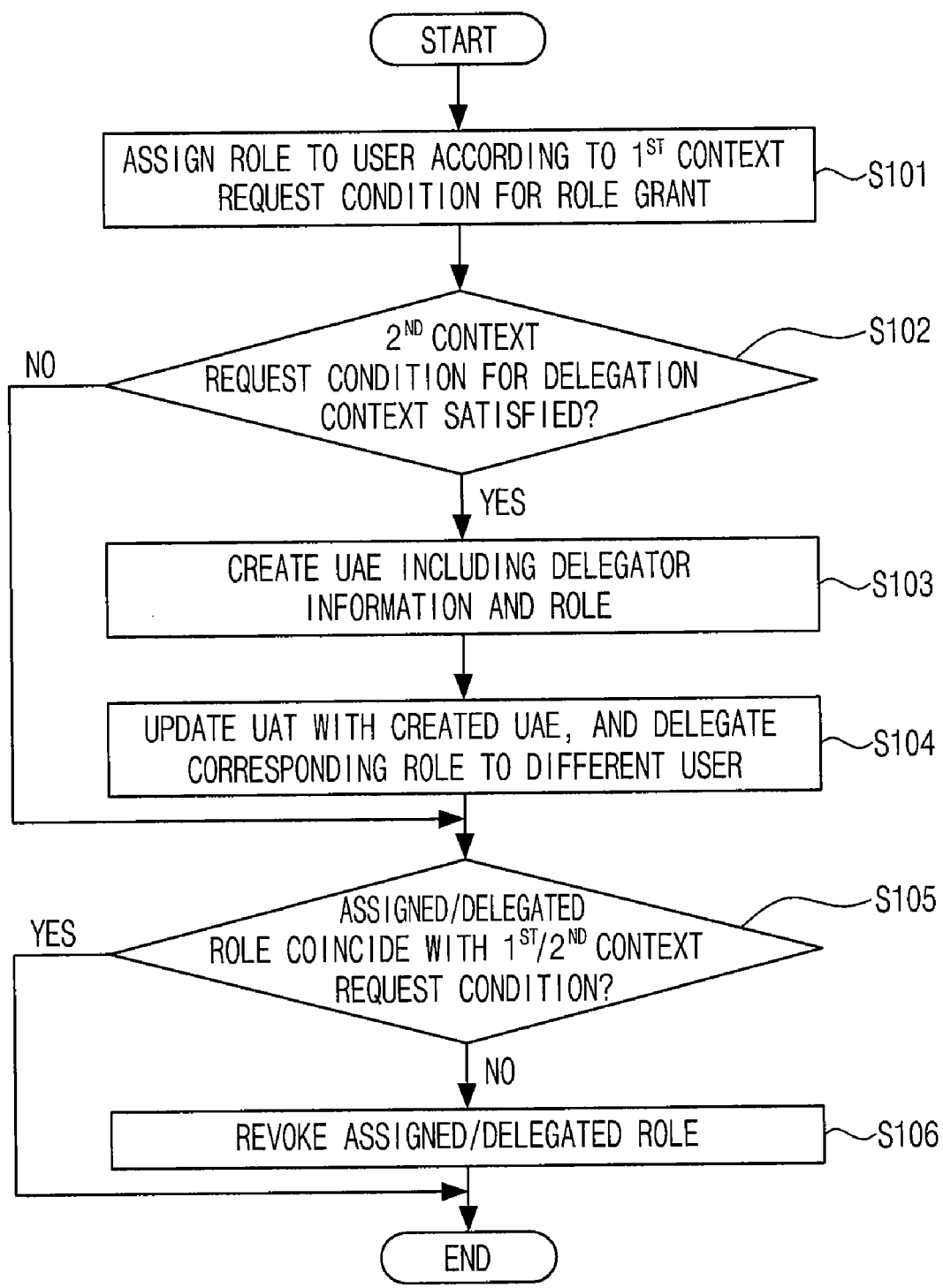
FIG. 4 is a flowchart illustrating the control method of a context-aware user assignment manager (CAUAM) in the context-aware role-based access control system according to an exemplary embodiment of the present invention.

FIG. 4 is a flowchart illustrating the control method of the context-aware user assignment manager (CAUAM) in the context-aware role-based access control system according to an exemplary embodiment of the present invention.

Hereinafter, the procedure of the control method of the CAUAM 100 according to an exemplary embodiment of the present invention will be described with reference to FIG. 4.

In order to grant a role to the user according to the location and context information of the user, a role is assigned to the user according to a preset first context request condition (step 101).

For a context to delegate the role of the user to a different user, it is checked if a preset second context request condition is satisfied (step 102). Here, the first/second context request condition is the same as that described above.

When the second context request condition is satisfied as a result of the check, a user assignment element (UAE) including assigner information and an assigner's role is created (step 103). In contrast, when the second context request condition is not satisfied, step 105 is performed, without passing through the delegation-related step.

A user assignment table (UAT) is updated with the created UAE, and the corresponding role is delegated to the different user (step 104).

It is checked if the assigned or delegated role coincides with the preset first/second context request condition (step 105).

When the assigned or delegated role does not coincide with the preset first/second context request condition as a result of the check, the allocated or delegated role is revoked (step 106). In contrast, when the assigned or delegated role coincides with the preset first/second context request condition, the procedure proceeds to an END step (wherein the "END" represents that an operation of the CAUAM 100 in the context-aware role-based access control system is terminated, and "START" may follow the "END").

Steps 101 to 106 described above are performed by the components (i.e. the AAC 110, the ADC 130, and the ARC 150) of the CAUAM 100, the detailed operations of which have been described with reference to FIG. 2.

Figure 5:
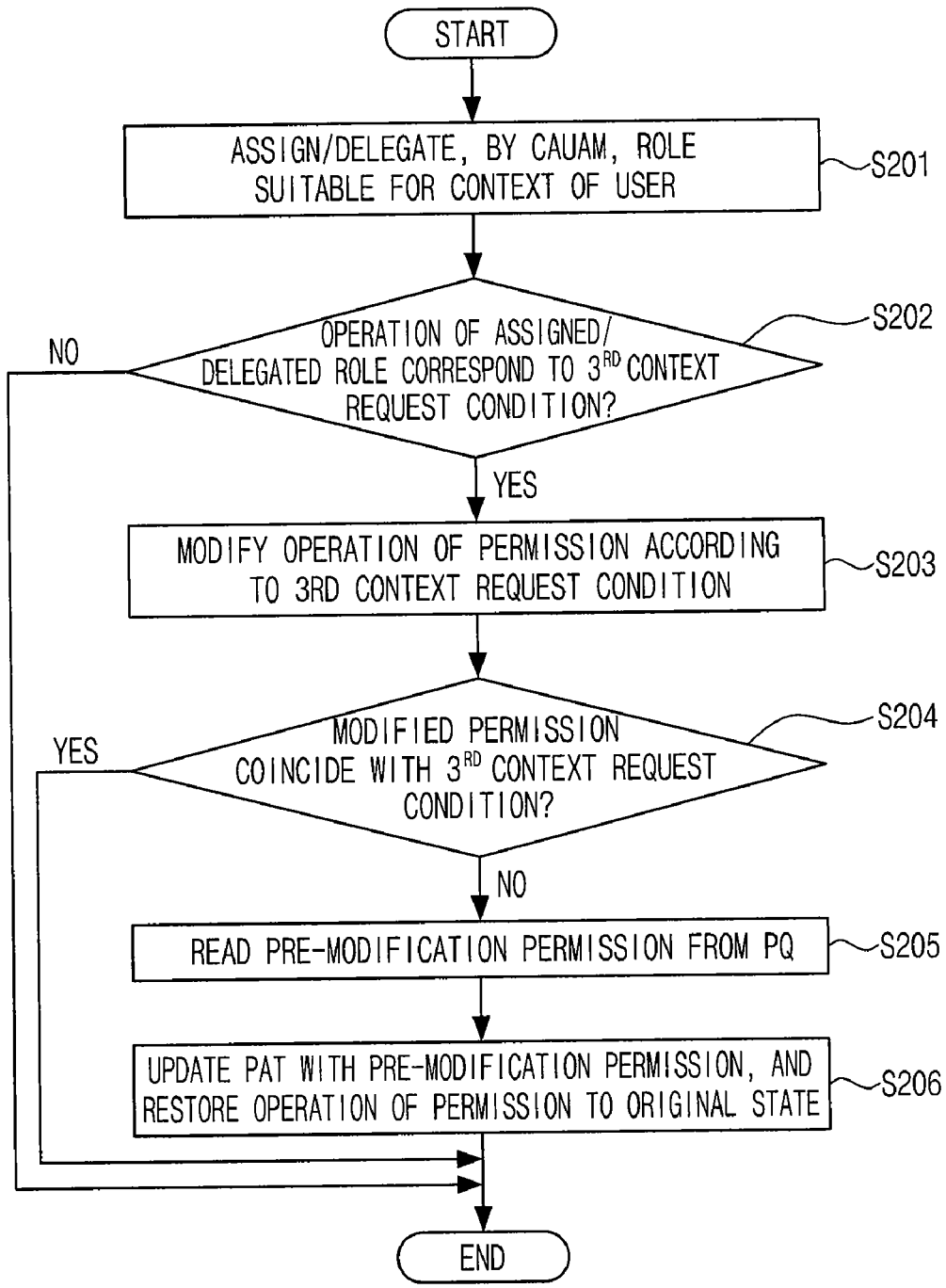
FIG. 5 is a flowchart illustrating the control method of a context-aware permission assignment manager (CAPAM) in the context-aware role-based access control system according to an exemplary embodiment of the present invention.

FIG. 5 is a flowchart illustrating the control method of the context-aware permission assignment manager (CAPAM) in the context-aware role-based access control system according to an exemplary embodiment of the present invention.

Hereinafter, the procedure of the control method of the CAPAM 300 according to an exemplary embodiment of the present invention will be described in advance with reference to FIG. 5.

A role suitable for the context of the user is assigned or delegated by the CAUAM 100 (step 201).

It is checked if the operation of a permission, which the assigned or delegated role has, corresponds to the third context request condition preset according to contexts requiring modification (step 202). Here, a description of the third context request condition has been given above.

When the operation of the permission corresponds to the third context request condition as a result of the check, the operation of the permission is modified according to the third context request condition (step 203). In contrast, when the operation of the permission does not correspond to the third context request condition, the procedure proceeds to an END step.

It is determined if the modified permission coincides with the third context request condition (step 204).

When the modified permission does not coincide with the third context request condition as a result of the determination, a pre-modification permission is read from a permission queue (PQ) (step 205). In contrast, when the modified permission coincides with the third context request condition, the procedure proceeds to the END step. Here, the "END" represents that an operation of the CAPAM 300 in the context-aware role-based access control system is terminated, and "START" may follow the "END."

A permission assignment table (PAT) is updated with the pre-modification permission, so that the operation of a corresponding permission is restored to the original state (step 206).

Steps 201 to 206 described above are performed by the components (i.e. the APMC 310, the APRC 330, and the PPMC 350) of the CAPAM 300, the detailed operations of which have been described in advance with reference to FIG. 2.

The present invention relates to a context-aware role-based access control system and a control method thereof, and more particularly to a context-aware role-based access control system capable of becoming aware of the context of the user, assigning/delegating/revoking a role according to the current context, and modifying/restoring an operation of the permission granted to the corresponding role, and a control method thereof.

According to the present invention, it is possible to assign/delegate/revoke a role adaptively to the current context of the user, it is possible to modify/restore a permission granted to a role according to a context request condition, and it is possible to perform modification to a personalized permission by taking the preference information of the user into consideration. Accordingly, more efficient access control can be achieved in ubiquitous environments where the context of the user dynamically changes.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A context-aware role-based access control system comprising:
   a processor and a memory storing a software, that when executed by the processor performs:
   a context-aware user assignment manager (CAUAM) for performing a role assignment function, a role delegation function, or a role revocation function for a user according to a context of the user without intervention from a security manager, based on a preset context request condition including at least one context description connecting a plurality of contexts with the user;
   a context-aware permission assignment manager (CAPAM) for performing a permission modification, a permission restoration, and a personalized permission modification for a permission, which the role has, according to changes in the context of the user;
   an information repository for storing a user profile and context information;
   an access control manager (ACM) for controlling the context-aware user assignment manager, the context-aware permission assignment manager, and the information repository, and processing an access control request; and
   a personalized permission modification component (PPMC) for modifying the permission, which the role assigned to the user has, into a permission preferred by the user among permissions for performing an equal operation, by making reference to a user profile.

2. The system as claimed in claim 1, wherein the context-aware user assignment manager comprises:
   an adaptive assignment component (AAC) for assigning the user a role based on a first context request condition, which is preset to grant the user a role according to information on a location and a state of the user;
   an adaptive delegation component (ADC) for delegating the role of the user to a different user based on a second context request condition, which is preset for a context in which the role of the user is to be delegated to the different user; and
   an adaptive revocation component (ARC) for determining if the assigned or delegated role coincides with the preset context request condition, and revoking the assigned or delegated role when the assigned or delegated role does not coincide with the preset context request condition.

3. The system as claimed in claim 2, wherein the first context request condition is established with the context request conditions, according to a role assignment table (RAT) which is defined in the form of role assignment elements (RAEs).

4. The system as claimed in claim 2, wherein the second context request condition is established with the context request conditions, according to a role delegation table (RDT) in which the context request conditions are defined in the form of role delegation elements (RDEs).

5. The system as claimed in claim 3, wherein the adaptive revocation component checks if the role assignment table and the role delegation table coincides with the first and second context request condition, and revokes a user assignment element from a user assignment table (UAT) when the role assignment table and the role delegation table does not coincide with the first and second context request condition, thereby revoking the assigned or delegated role.

6. The system as claimed in claim 1, wherein the permission assignment manager comprises:
   an adaptive permission modification component (APMC) for modifying an operation of a permission, which a role granted by the context-aware user assignment manager has, based on a third context request condition preset according to contexts requiring modification; and
   an adaptive permission restoration component (APRC) for checking if the modified permission coincides with the third context request condition, and restoring the operation of the modified permission to an original state when the modified permission does not coincide with the third context request condition.

7. The system as claimed in claim 6, wherein the third context request condition is established with the context request conditions, according to a permission management table (PMT) which is defined in the form of permission management elements (PMEs) for contexts requiring modification.

8. The system as claimed in claim 6, wherein when the modified permission does not coincide with the third context request condition, the adaptive permission restoration component reads the pre-modification permission from a permission queue, and updates the permission assignment table (PAT), thereby restoring the operation of the permission to an original state.

9. The system as claimed in claim 6, wherein the personalized permission modification component (PPMC) updates a permission assignment table with a permission highly preferred by the user, among permissions for performing an equal operation, by making reference to the user profile, thereby modifying the permission into a personalized permission.

10. The system as claimed in claim 1, wherein the information repository comprises:
    a user profile repository (UPR) for storing a state history of the user, and preference information of the user; and
    a context information repository (CIR) for storing the context information acquired from a ubiquitous environment.

11. The system as claimed in claim 1, wherein the access control manager transmits the context information, which is updated, to the information repository.

12. A control method of a context-aware user assignment manager (CAUAM) in a context-aware role-based access control system including a processor, the method comprising the steps of:
    assigning, by the processor, a role to a user based on a first context request condition, which is preset to grant the user a role according to at least one context description connecting a plurality of contexts with the user, the plurality of contexts including information on a location and a state of the user;
    checking, by the processor, if a second context request condition, which is preset for a context in which the role of the user is to be delegated to a different user, is satisfied;
    creating, by the processor, a user assignment element (UAE) which includes delegator information and a delegator's role when the second context request condition is satisfied as a result of the check;
    updating, by the processor, a user assignment table (UAT) with the created user assignment element, and delegating the role to the different user;
    determining, by the processor, if the assigned or delegated role coincides with the preset context request condition;
    revoking, by the processor without intervention from a security manager, the assigned or delegated role when the assigned or delegated role does not coincide with the preset context request condition as a result of the determination; and modifying, by the processor, a permission, which a role assigned to the user has, into a permission preferred by the user among permissions for performing an equal operation, by making reference to a user profile.

13. The method as claimed in claim 12, wherein the first context request condition is established with the context request conditions, according to a role assignment table (RAT) which is defined in the form of role assignment elements (RAEs); and the second context request condition is established with the context request conditions, according to a role delegation table (RDT) in which the context request conditions are defined in the form of role delegation elements (RDEs).

14. A control method of a context-aware permission assignment manager (CAPAM) in a context-aware role-based access control system including a processor, the method comprising the steps of:

assigning or delegating, by a context-aware user assignment manager without intervention from a security manager, a role suitable for a context of a user;

checking, by the processor, if an operation of a permission, which the assigned or delegated role has, corresponds to a third context request condition which is preset according to contexts requiring modification, the third context request condition including at least one context description connecting a plurality of contexts with the user;

modifying, by the processor, the operation of the permission according to the third context request condition, when the operation of the permission corresponds to the third context request condition as a result of the check;

determining, by the processor, if the modified permission coincides with the third context request condition;

reading, by the processor, the pre-modification permission from a permission queue (PQ), when the modified permission does not coincide with the third context request condition as a result of the determination;

updating, by the processor, a permission assignment table with the pre-modification permission, and restoring the operation of the permission to an original state; and modifying, by the processor, a permission, which a role assigned to the user has, into a permission preferred by the user among permissions for performing an equal operation, by making reference to a user profile.

15. The method as claimed in claim 14, wherein the third context request condition is established with the context request conditions, according to a permission management table (PMT) which is defined in the form of permission management elements (PMEs) for contexts requiring modification.

16. The system as claimed in claim 4, wherein the adaptive revocation component checks if the role assignment table and the role delegation table coincides with the first and second context request condition, and revokes a user assignment element from a user assignment table (UAT) when the role assignment table and the role delegation table does not coincide with the first and second context request condition, thereby revoking the assigned or delegated role.

* * * * *